(12) United States Patent
Gehrke et al.

(10) Patent No.: US 8,543,262 B1
(45) Date of Patent: Sep. 24, 2013

(54) ELECTRIC BOOST OF TURBINE ENGINE OUTPUT POWER AND POWER CONTROL SYSTEM

(75) Inventors: Jens Gehrke, Rancho Palos Verdes, CA (US); Parsa Mirmobin, Tucson, AZ (US); Cristian Anghel, Oro Valley, AZ (US); Gordon Beatty, Tucson, AZ (US)

(73) Assignee: Honeywell International, Inc, Morristown, NJ (US)

( * ) Notice: Subject to any disclaimer, the term of this patent is extended or adjusted under 35 U.S.C. 154(b) by 0 days.

(21) Appl. No.: 13/462,722

(22) Filed: May 2, 2012

(51) Int. Cl.
*G01C 23/00* (2006.01)
*G01C 19/06* (2006.01)
*B64C 27/00* (2006.01)

(52) U.S. Cl.
USPC .............................. 701/3; 244/17.11; 74/5.37

(58) Field of Classification Search
USPC ..................... 701/3–17; 244/6, 17.13, 137.1, 244/60, 136, 17.11; 477/34; 74/665, 5.37
See application file for complete search history.

(56) References Cited

U.S. PATENT DOCUMENTS

| 5,028,803 | A | 7/1991 | Reynolds |
| 5,039,933 | A * | 8/1991 | Dong ............................... 322/47 |
| 2008/0006739 | A1 * | 1/2008 | Mochida et al. ................ 244/60 |
| 2010/0013223 | A1 | 1/2010 | Certain |
| 2010/0301158 | A1 | 12/2010 | Harris et al. |
| 2011/0316490 | A1 * | 12/2011 | Lang et al. ....................... 322/21 |
| 2012/0012692 | A1 * | 1/2012 | Kroo ................................ 244/6 |
| 2012/0025012 | A1 * | 2/2012 | Arlton et al. ............... 244/17.13 |

FOREIGN PATENT DOCUMENTS

EP         1712761        10/2006

* cited by examiner

*Primary Examiner* — Muhammad Shafi
(74) *Attorney, Agent, or Firm* — Shimokaji & Assoc., PC

(57) ABSTRACT

The mechanical output power of a turbine engine can be electrically boosted by using a power control system which may include a power source, an electric machine, a prime mover coupled to the electric machine, and a power control module coupled to the power source and the electric machine. The power control module may be configured to operate the electric machine between a motoring mode driving a mechanical load and a generator mode supplying power to an electrical load at speeds normally associated with generating modes only.

19 Claims, 9 Drawing Sheets

ELECTRIC BOOST OF TURBINE ENGINE OUTPUT POWER AND POWER CONTROL SYSTEM

BACKGROUND OF THE INVENTION

The present invention generally relates to power distribution and more particularly, an electric boost of turbine engine output power and power control system.

As machines become increasingly complex, the demand for output power from electric generation machines increases. Power requirements may be load specific and the generation of output power for different loads may be supplied by various sources. Typically, vehicles have requirements for both mechanical and electrical output generation. However, space and weight constraints in vehicle design may limit the availability to add power generating sources.

Military vehicles, for example, may sometimes be called upon to be versatile in maneuvering about various terrains. Where some conventional vehicle were designed to travel on either land, air, or water, more hybrid craft have been developed that can travel over two or more or air, land, or water.

Some vehicles may wish to employ rotary wing flight technology. Flight transitions of rotary wing aircraft may need high transient peak power. An example of such a transient is the take-off of a rotary wing aircraft. The engine, typically a turbine-type engine, may need to be capable of providing this high transient power. Thus, typically, either an oversized engine may be used or a conventional engine may be stressed resulting in reduced engine life.

The turbine engines used for rotary wing aircraft typically have a high-pressure and a low-pressure spool. Power for the propulsor (rotary wing) is extracted from the low-pressure spool via a gearbox with multiple power takeoff pads. This transmission lowers the output speed for use by various loads and it provides power to the generator and the propulsor (rotary wing).

As can be seen, there is a need for a power control system that can provide the capability to boost the output power of the turbine engine providing high transient power.

SUMMARY OF THE INVENTION

In one aspect of the present invention, a power control system comprises a power source; an electric machine; an electrical load coupled to the electric machine; a prime mover coupled to the electric machine; a mechanical load coupled to the prime mover; and a power control module coupled to the power source and the electric machine, wherein the power control module is configured to operate the electric machine between: a generating mode supplying power to the electrical load, and a motoring mode driving the mechanical load.

In another aspect of the present invention, a method of controlling power in a hybrid vehicle that includes a traction wheel system and a rotary propeller system, comprises operating an electric machine, coupled to the traction wheel system and the rotary propeller system, in a generating mode to drive the traction wheel system according to a power control strategy defined by equations comprising:

$$\phi_{ag} = \phi_{fa} + \phi_{sa} \qquad \text{Eq. (1):}$$

where $\phi_{ag}$ is a flux in air-gap, $\phi_{fa}$ is a flux produced by a rotor in a stator windings of the electric machine and $\phi_{sa}$ is a flux caused by a stator current $I_a$ $$E_{ag} = E_{fa} + E_{sa} \qquad \text{Eq. (2):}$$

where $E_{ag}$ is a voltage induced by $\phi_{ag}$, $E_{fa}$ is a voltage induced by $\phi_{fa}$ and $E_{sa}$ is a voltage drop in inductance of an armature in the electric machine, and $$V_a = E_{ag} + (R_a + (j\omega L_a))I_a \qquad \text{Eq. (3):}$$

where $V_a$ is the terminal voltage, $R_a$ is the armature resistance, $\omega$=angular speed, j is a complex operator, $L_s$ is synchronous reactance; and operating the electric machine in a motoring mode providing increased transient power to drive the rotary propeller system according to the power control strategy, wherein the stator current ($I_a$) is placed at a lagging angle ($\alpha$) with respect to the voltage ($E_{fa}$).

In still yet another aspect of the present invention, a hybrid vehicle comprises a body; a traction wheel system coupled to the body; a rotary propeller system coupled to the body; a prime mover coupled to the rotary propeller system; an electric machine coupled to the prime mover; a power controller coupled to the electric machine and the traction wheel system, wherein the power controller is configured operate the electric machine between: a generating mode driving the traction wheel system, and a motoring mode driving the rotary propeller system, wherein the motoring mode produces a higher torque output from the prime mover than the generating mode.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention generally provide a power control system that can boost turbine engine output during times needing higher transient peak power. Exemplary embodiments of the power control system described can be beneficial, for example, for either land-based or rotary wing flight based vehicles. In an aspect of the present invention, movement of vehicles needing high transient peak power may be derived from using a common electric machine to supply various output types to different loads. In one aspect, the electric machine may be used as a starter, a generator and as a motor.

Figure 1:
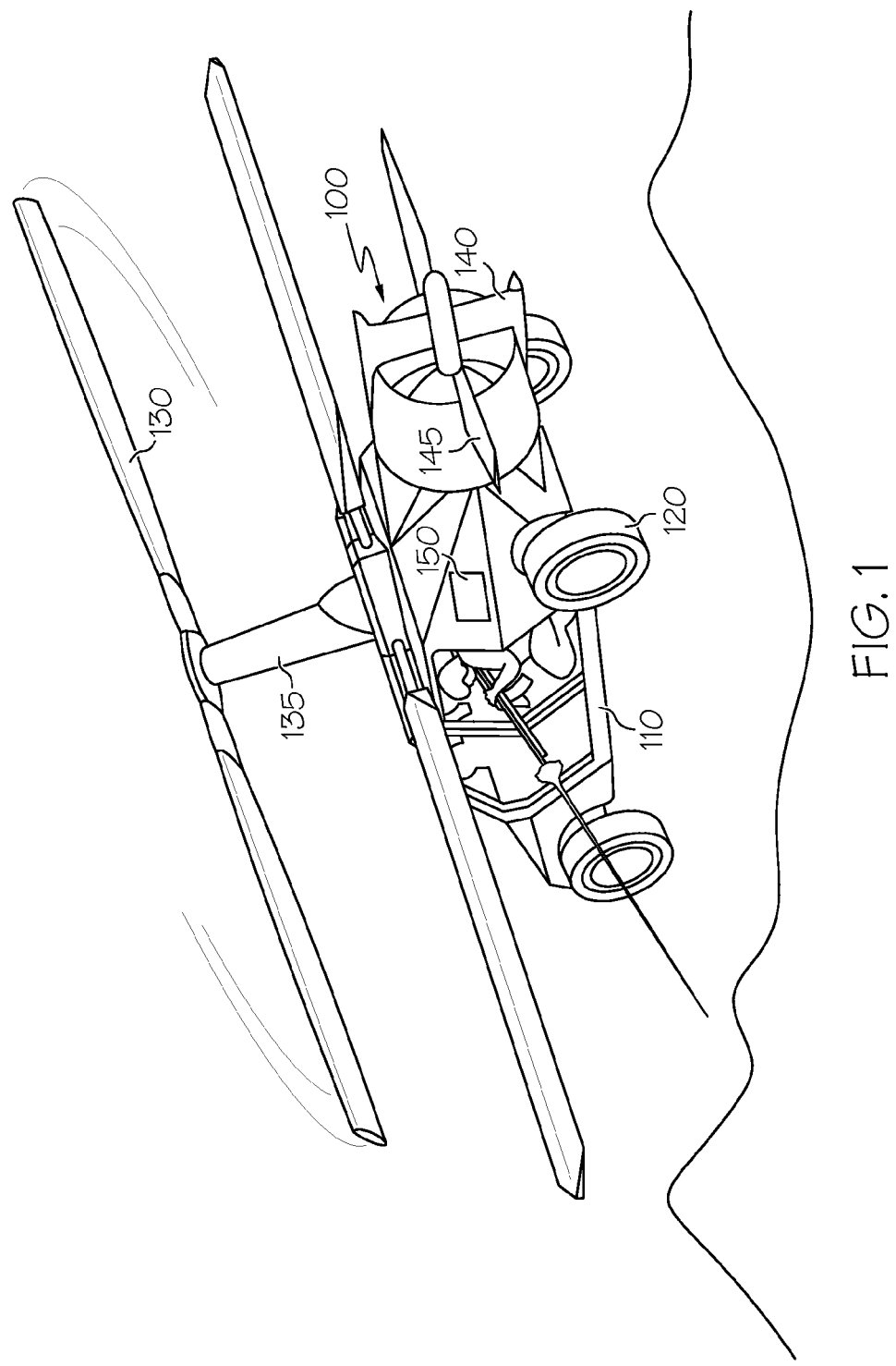
FIG. 1 is a perspective side view of a hybrid land/rotary wing vehicle in accordance with an exemplary embodiment of the present invention.

Referring to FIG. 1, a hybrid land/rotary wing vehicle 100 is shown according to an exemplary embodiment of the present invention. The hybrid land/rotary wing vehicle 100 may also be referred to as the vehicle 100. The vehicle 100 may be one type of vehicle that may benefit from aspects of the present invention. It will be understood however, that other vehicles and machines may benefit from employing aspects of the present invention and their use is contemplated herein. The vehicle 100 may include a body 110, wheels 120, a rotary wing 130, and a power control system 150. The wheels 120 and rotary wing 130 may be coupled to the body 110. The wheels 120 may be traction wheels adapted to travel over terrain. It will be understood that the power control system 150 (represented by a box) may be positioned internally within the body 110. The power control system 150 may supply power to the wheels 120 and may control the operation and output of a turbine engine (not shown) connected to the rotary wing 130 and a ducted fan 140. The vehicle 100 may include more than one rotary wing 130. The rotary wings 130 may extend from and fold out from sides of the vehicle 100. The rotary wings 130 may include a mast 135 that comes up and houses a slowed rotor system (not shown). The vehicle 100 may also include at a rear end, the shrouded, ducted fan 140 that provides forward motion and a series of control surfaces 145 that help regulate speed, as well as pitch, roll and yaw. In one aspect, the vehicle 100 may be a hybrid electric vehicle using the power control system 150 for power while the vehicle is airborne and using the power control system 150 for land-based movement while the vehicle is on the ground.

Figure 2:
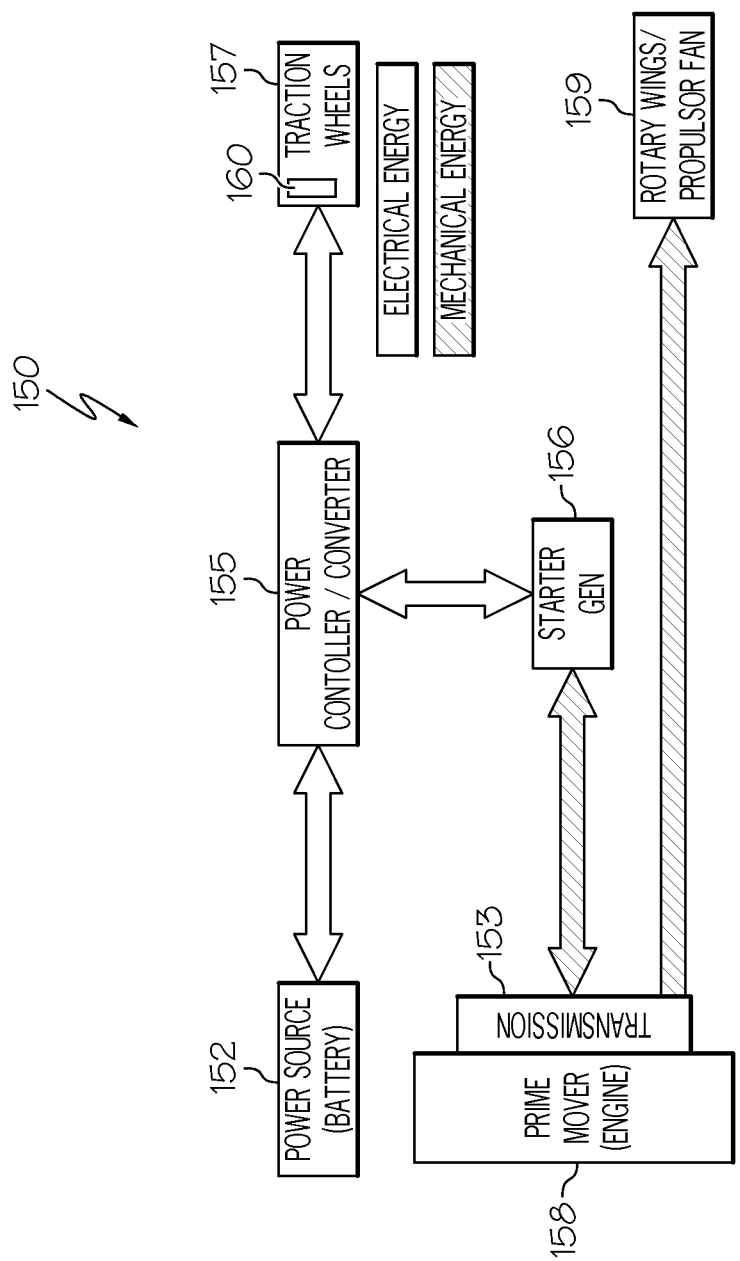
FIG. 2 is a block diagram of a power control system according to an exemplary embodiment of the present invention that may be employed in the hybrid land/rotary wing vehicle of FIG. 1.

Referring now to FIG. 2, the power control system 150 is shown in accordance with an exemplary embodiment of the present invention. The flow of energy type (electrical or mechanical) is represented by arrows of different shading. Throughout FIGS. 2-7, the un-hatched arrows represent electrical flow while the hatched arrows represent mechanical energy flow. The skinny arrow marked in the form $P_n$ may represent supplemental output as described in more detail below. The power control system 150 may include a power control module 155, an electric machine 156, and prime mover 158. The power control system 150 may also include a power source 152, for example, a battery, a fuel cell, etc. The power source 152 may be coupled to the power control module 155.

The power control module 155 may be configured with power electronics to function as a power controller and/or a power converter as needed. The power controller 150 may be configured to provide bi-directional power. The power control module 155 may be coupled to an electrical load 157. In an exemplary embodiment, the electrical load 157 may be an electrically driven traction wheel system 157. For sake of illustration, the electrical load 157 will be referred to herein out as the traction wheel system 157. The traction wheel system 157 may include traction wheels 120 (FIG. 1) and a traction wheel motor system 160 (FIG. 2). The power control module 155 may also be coupled to the electric machine 156.

The electric machine 156 may be, for example, a wound field type, a permanent magnet type or and induction type machine. In one aspect of the present invention, the electric machine may be driven to function as a combination of two or more of a starter, motor, or generator when transitioning from one mode of operation to another. The electric machine 156 may be coupled between the power control module 155 and the prime mover 158. During a startup mode, the electric machine 156 may receive power from the power source 152 and a startup command from the power control module 155 and operate as starter to start the prime mover 158.

The prime mover 158 may be for example, a turbo-shaft engine. A transmission 153 may be coupled to the prime mover 158. The transmission 158 may be coupled to a mechanical load 159. The mechanical load 159 may be, for example a rotary propeller system. For sake of illustration, the mechanical load 159 will be referred to herein out as the rotary propeller system 159. The rotary propeller system 159 may be rotary wings or a propulsor fan (for example the rotary wings 130 and/or the propulsor fan 140 of FIG. 1) capable of lifting and/or maneuvering the vehicle 100 (FIG. 1) into flight.

Figure 3:
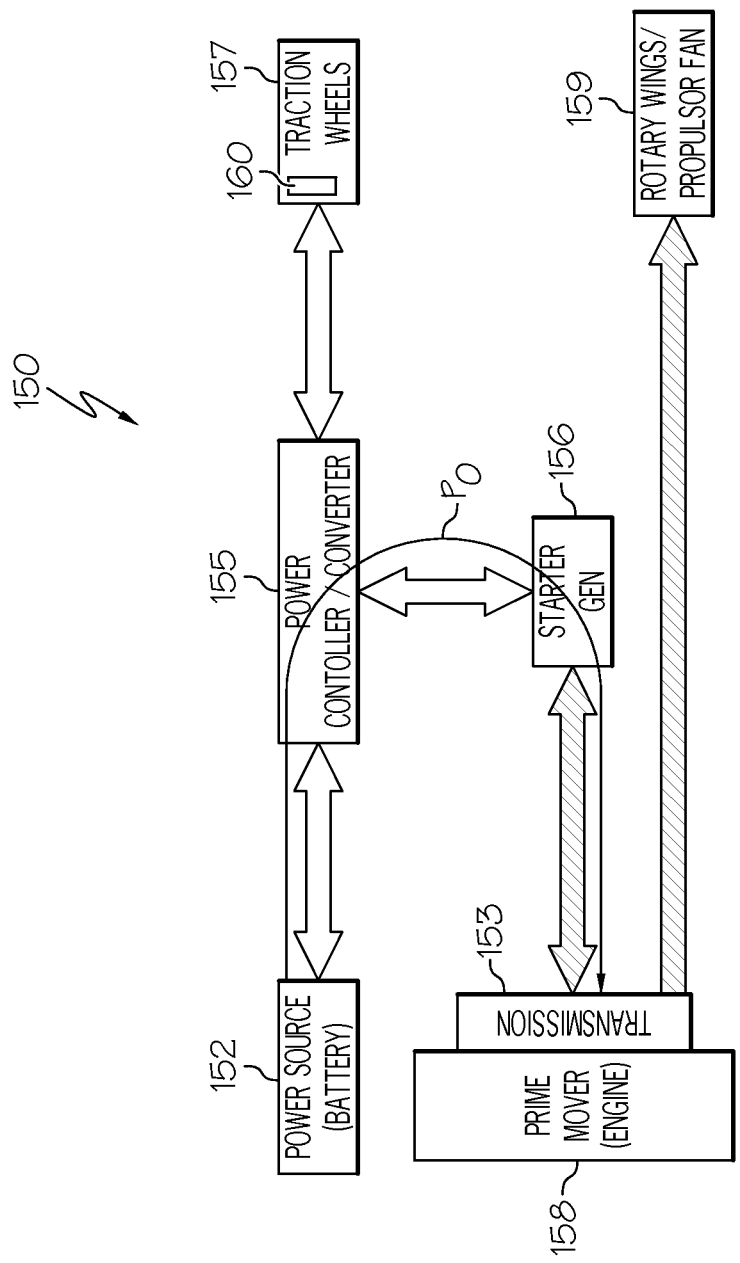
FIG. 3 is a block diagram of the power control system of FIG. 2 according to an exemplary embodiment of the present invention.

Referring now to FIG. 3, the power control system 155 shown is the same as in FIG. 2, however, aspects of the power control system 150 are shown employing a starting mode. The power controller 150 may be configured to provide bi-directional power to provide, for example, the start power for the vehicle's engine (prime mover 158). The startup power is represented by the arrow $P_0$. The power controller 150 may control the amount of power supplied to the electrical machine 156 to operate as a starter and to drive the prime mover 158. This system may be superior to a directly energized brushed DC starter because it allows for a very controlled starting profile from zero speed to light off. This may improve engine reliability. Additionally, this configuration may avoid the need for a dedicated start battery. Input power for startup may come from either from an on board battery, for example, power source 152, or off vehicle from an input converter (not shown). With minimal changes to the start controller, multi-use capability can be achieved. After the start, the power controller 150 can be used to the drive traction wheel system 157, charge the power source 152, or provide power augmentation, for example, during the need to drive the rotary system 159.

Figure 4:
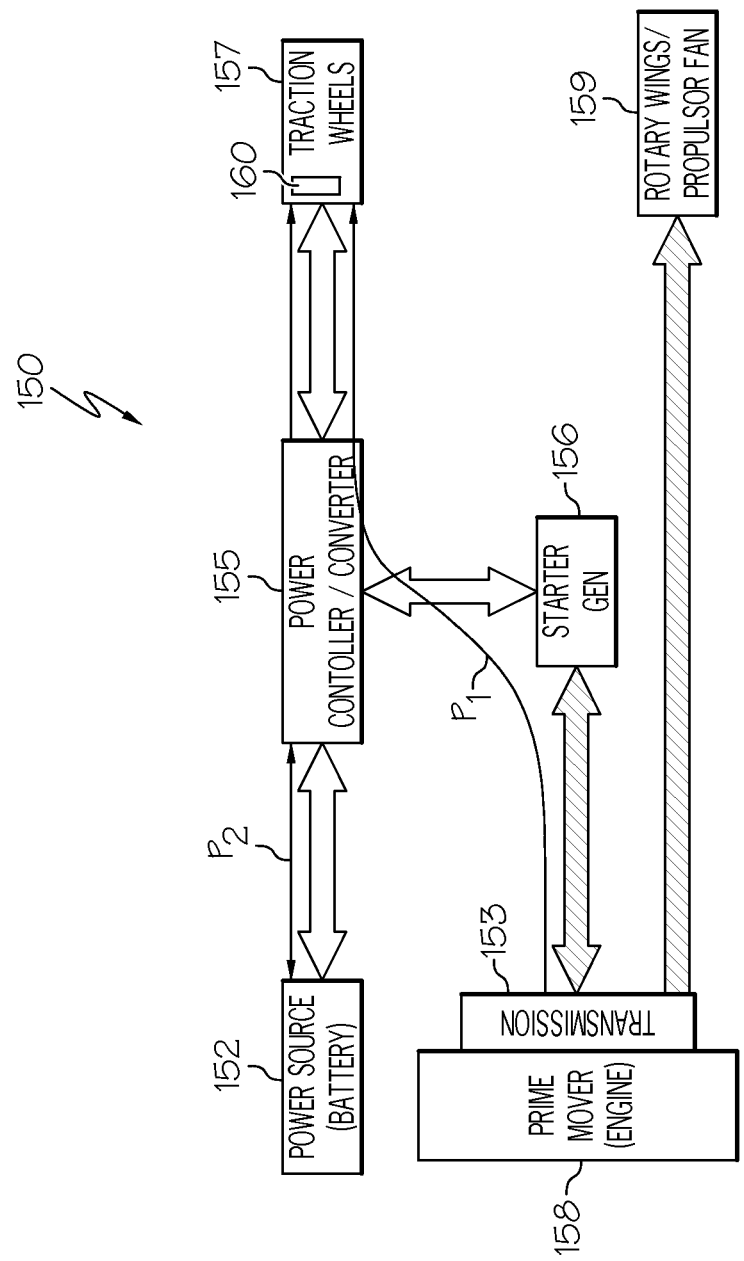
FIG. 4 is a block diagram of the power control system of FIG. 2 according to another exemplary embodiment of the present invention.

Referring now to FIG. 4, the power control system 155 is shown according to an exemplary embodiment operated under an electric generating mode. In one aspect, the electric machine 156 may be operated in a generating mode (in a generating speed range) generating electric power to drive the traction wheel system 157 to move the vehicle along the ground. During the generating mode of the electric machine 156, an electric wheel drive of the traction wheel system 157 may be performed. The prime mover 158 may drive the electric machine 156 to produce the electric power driving the traction wheel system 157. The output (represented by arrow $P_1$) of the electrical machine 156 may be conditioned and controlled by the power control module 155 and provided to the traction wheel system 157. The electrical machine 156 may be sized to meet the performance requirements of the vehicle, typically in the hundreds of kilowatts for electric wheel drive. When electric machine 156 generation capacity exceeds the power demand of traction wheel system 157, the excess electrical power may be used to charge the power source 152.

In another aspect, the power source 152 can also be used to provide limited mobility of the vehicle by providing power (represented by arrow $P_2$) directly to the traction wheel system 157 without running the prime mover 158. Additionally the power source 152 can be used to augment the electric power supplied by the electric machine 156 during high wheel drive power demands.

Figure 5:
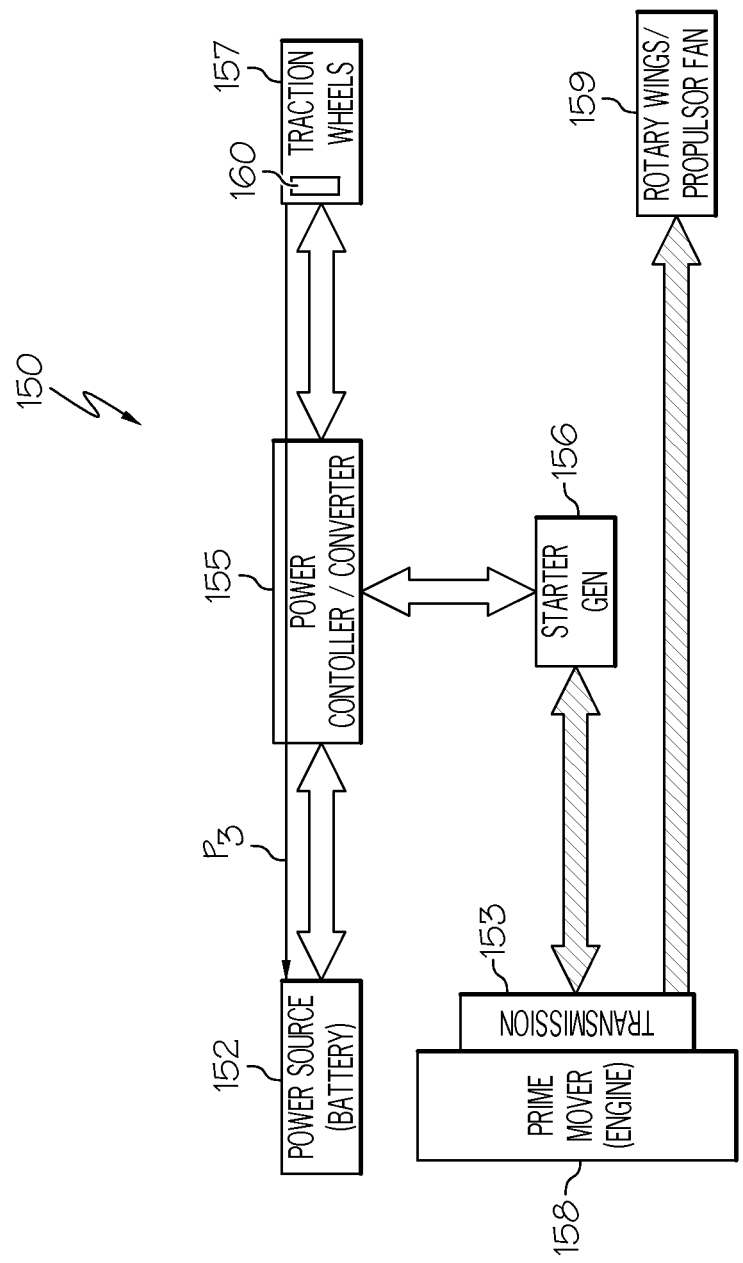
FIG. 5 is a block diagram of the power control system of FIG. 2 according to another exemplary embodiment of the present invention.

Referring now to FIG. 5, the power control system 150 is shown according to another exemplary embodiment of the present invention. In one aspect, the power source 152 and the power controller 155 can be used to control regeneration. For example, the energy created by slowing down the traction wheel system 157 (represented by arrow $P_3$) when the electrical machine 156 is used as an electric motor may be used to recharge the power source 152.

Figure 6:
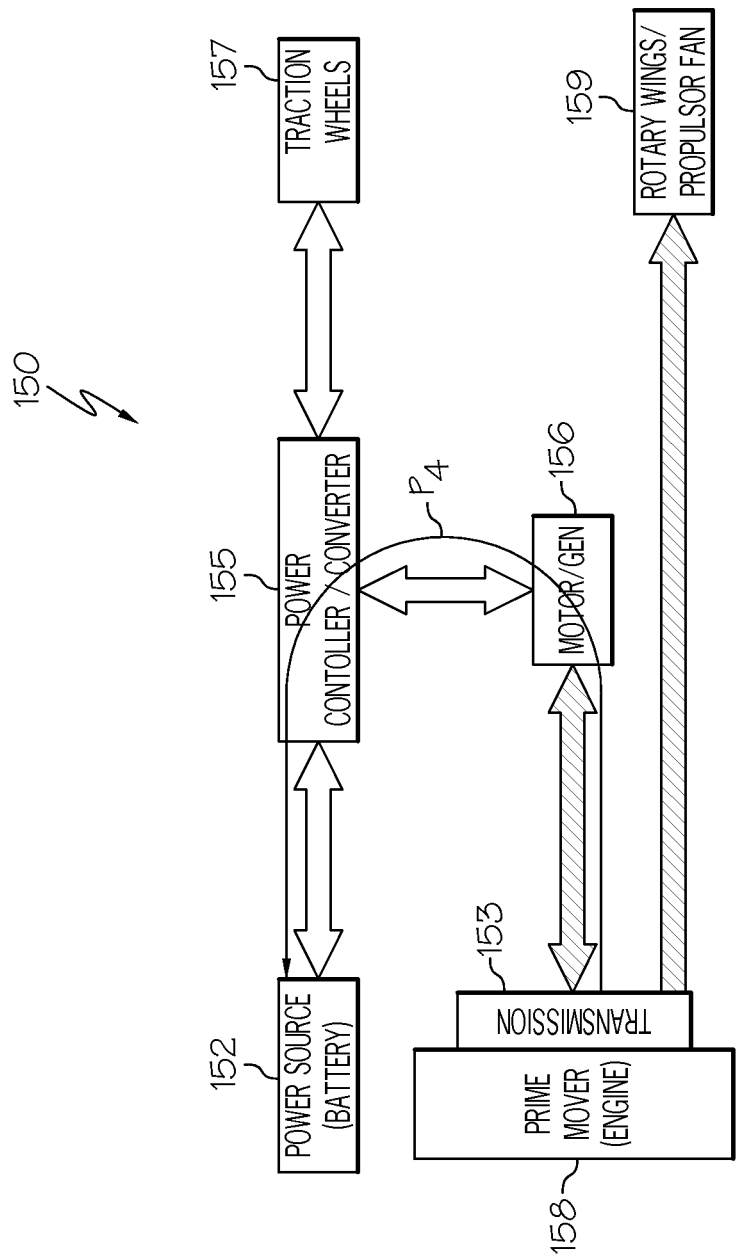
FIG. 6 is a block diagram of the power control system of FIG. 2 according to another exemplary embodiment of the present invention.

Referring now to FIG. 6, the power control system 150 is shown according to another exemplary embodiment of the present invention. When there is no demand for wheel power, the electric machine 156 may be used as a generator and the power control system 155 may be used to charge the power source 152. This may occur for example, during in-flight operating conditions because there is no need to provide power to the traction wheel system 157. Power (represented by arrow $P_4$) generated by the prime mover 158 may then be transferred to the power source 152.

Figure 7:
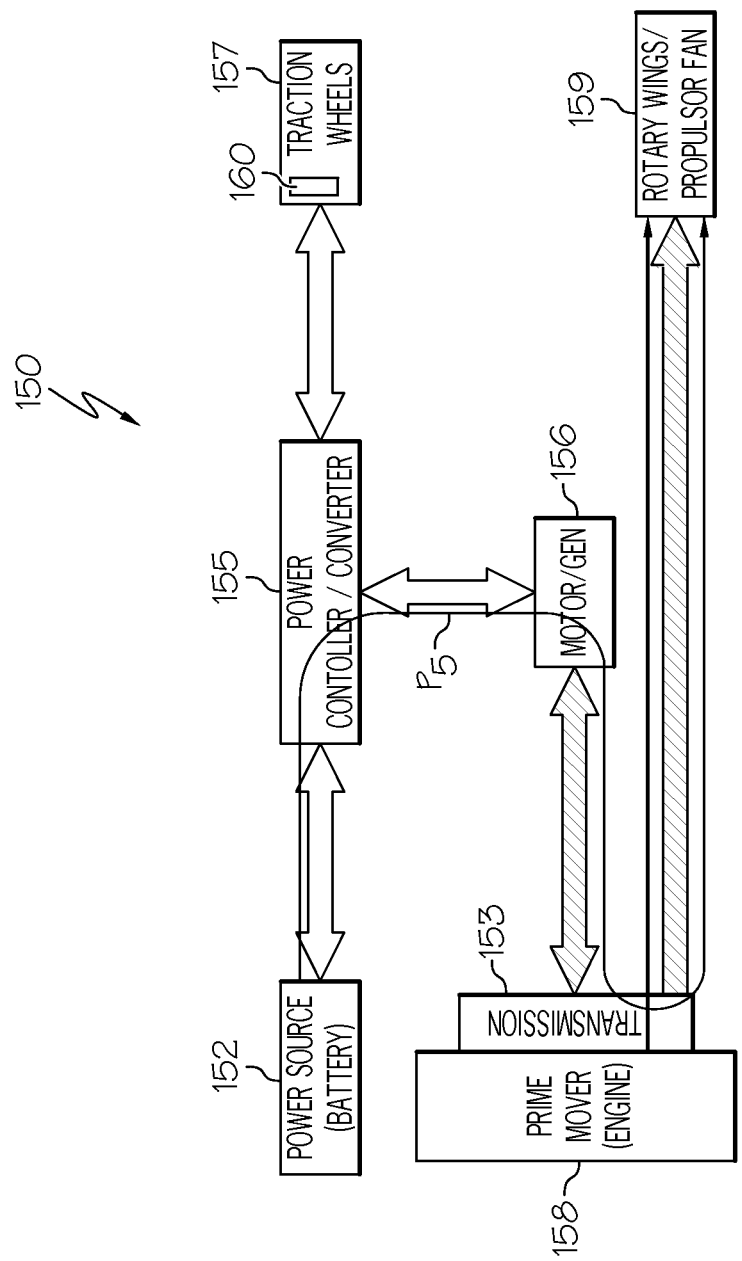
FIG. 7 is a block diagram of the power control system of FIG. 2 according to another exemplary embodiment of the present invention.

Referring now to FIG. 7, the power control system 150 is shown according to another exemplary embodiment of the present invention. In one aspect, the power control system 150 may be configured to provide augmented power to the prime mover 158 during high power transients for example, during a need to drive the rotary propeller system 159 into flight. The power flow (represented by the arrow $P_5$) through the system 150 can be controlled such that electric machine 156 can be driven in a motoring mode added mechanical power to the prime mover 158 to provide higher peak output power. The motoring mode may operate the electric machine 156 as a motor in the higher speed range normally used for the generating mode without requiring a higher than available bus voltage. Thus, in one aspect, the electric machine 156 may create sufficient torque (represented by the thickened arrow between the prime mover 158 and the rotary propeller system 159) to provide motoring to the rotary propeller systems 159 without the need to boost the bus voltage by using a field weakening method. This approach will control the back EMF and produce torque in motoring mode at the nominal generating speed. A power source 152 with the same voltage as the electric machine 156 can be used eliminating the need for a boost DC/DC converter. The motoring mode may be employed, for example, during vehicle takeoff and transitions to forward flight. The duration of this power boost can be from for example, 20-30 seconds to several minutes.

Figure 8:
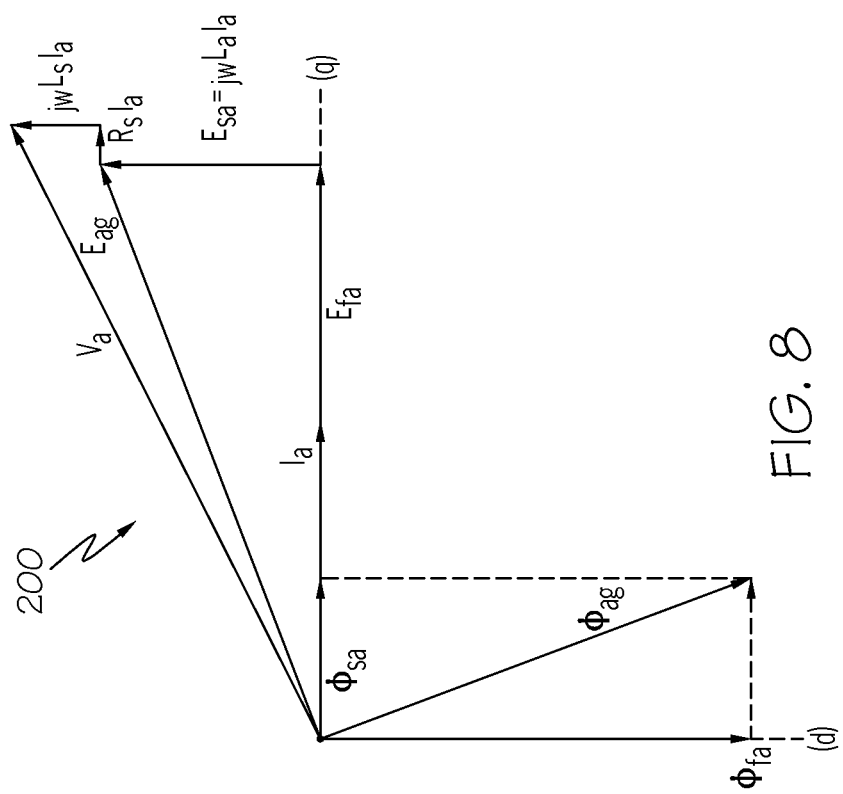
FIG. 8 is a vector diagram of a power control strategy according to an exemplary embodiment of the present invention.

Referring now to FIGS. 7 and 8, a power control strategy 200 for controlling the power control system 150 according to an exemplary embodiment is shown. The power control strategy 200 shows a vector diagram where the stator current $I_a$ in the electric machine 156 is controlled to be in phase with $E_{fa}$, which is aligned with the q axis. The stator current $I_a$ is in phase with the flux $\phi_{sa}$, it creates while the induced voltage $E_{fa}$ lags the fluxes that produced it by 90 degrees.

$$\phi_{ag}=\phi_{fa}+\phi_{sa} \qquad \text{Eq. (1):}$$

where $\phi_{ag}$ is the flux in air-gap, $\phi_{fa}$ is the flux produced by the rotor in the stator windings and $\phi_{sa}$ is the flux caused by stator current $I_a$.

$$E_{ag}=E_{fa}+E_{sa} \qquad \text{Eq. (2):}$$

where $E_{ag}$ is the voltage induced by $\phi_{ag}$, $E_{fa}$ is the voltage induced by $\phi_{fa}$ and $E_{sa}$ is the voltage drop in the inductance of the armature.

$$V_a=E_{ag}+(R_a+(j\omega L_a)I_a \qquad \text{Eq. (3):}$$

where $V_a$ is the terminal voltage, $R_a$ is the armature resistance, $\omega$=angular speed, j is a complex operator, and $L_a$ is synchronous reactance.

Equations (1), (2), and (3) show how the terminal voltage may be derived and represented by the schematic in FIG. 8 during, for example, the generating mode of the electric machine 156 to provide power to traction wheel system 157. However, the same terminal voltage $V_a$ is unlikely to provide current that produces enough torque to the rotary systems 159 through the electrical machine 156, at shaft speeds corresponding to the generating mode.

Figure 9:
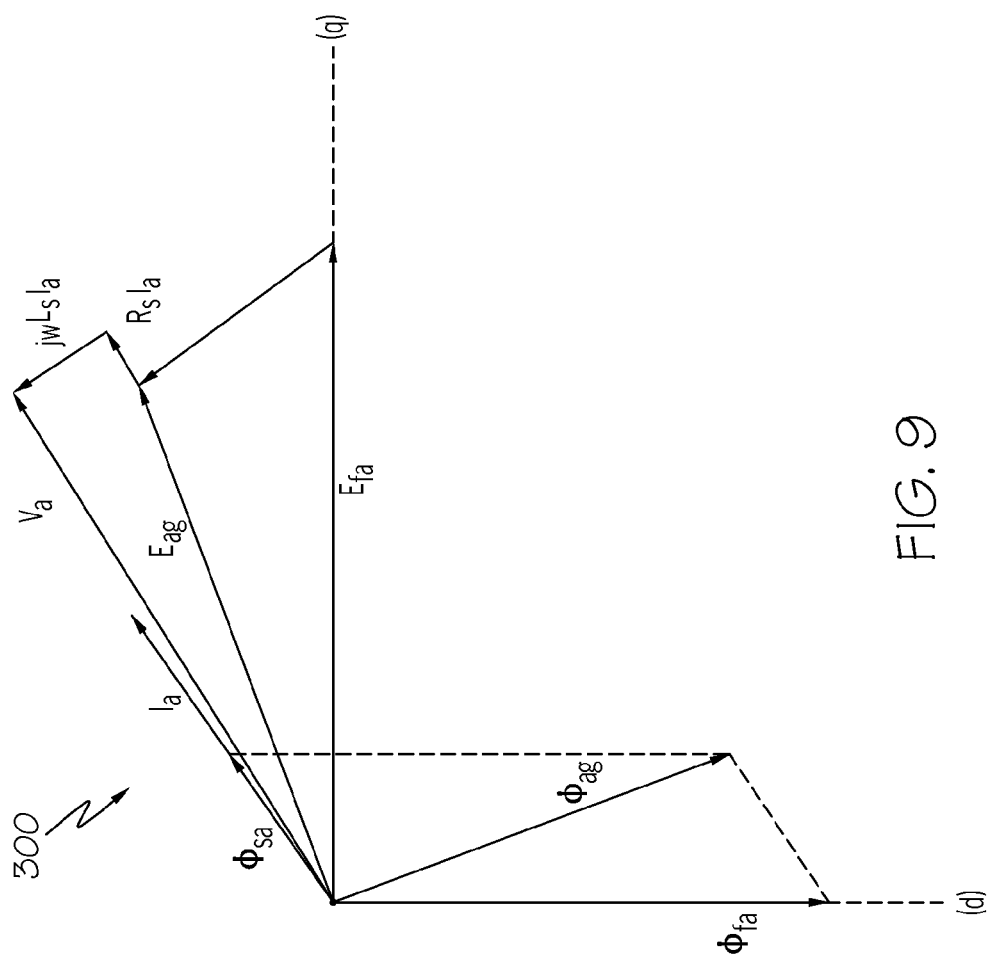
FIG. 9 is a vector diagram of a power control strategy according to another exemplary embodiment of the present invention.

Referring now to FIGS. 7 and 9, a power control strategy 300 for controlling the power control system 150 according to an exemplary embodiment is shown. The power control strategy 300 is similar to the power control strategy 200 except that the power control strategy 300 shows how to control the excitation and the stator current $I_a$ of the electric machine 156 to provide additional torque to the prime mover 158. Equations (1), (2), and (3) may also be used in calculating the terminal voltage $V_a$ during motoring mode at generating speed. However, the terminal voltage $V_a$ required during motoring may be less than without this control when the stator current $I_a$ is placed at a lagging angle ($\alpha$) rotating clockwise around a q-axis with respect to a voltage $E_{fa}$. By using the lagging angle ($\alpha$), the reluctance torque generated in the prime mover 158 resulting from rotating the stator current $I_a$ vector with respect to the q axis will add to the interaction torque, therefore increasing the overall torque produced by the electric machine 156. Moreover, the power control module 155 may control the electric machine 156 so that an excitation current, not shown but produces and is proportional to $\phi_{fa}$ and the stator current $I_a$ in the electric machine 156 are increased to maintain the air-gap flux $\phi_{ag}$ unchanged. By controlling the electric machine 156 to operate in a motoring mode that maintains the air-gap flux $\phi_{ag}$ unchanged with a smaller terminal voltage, the torque output of the prime mover 158 can be raised to deliver enough torque to drive the rotary propeller systems 159 to bring the vehicle 100 (FIG. 1) airborne and propel the vehicle 100 in a flight mode.

High power transients are often met by running a turbine engine core at higher temperatures. These high temperatures adversely affect the reliability of the engine. The use of the hybrid electric machine as a motor to provide power assists during high power transient conditions may eliminate the need to run engines at higher than design temperatures improving the system reliability. Additionally, when configuring the power control module 155 to provide multiple power modes, the overall impact to system weight may be minimal.

It should be understood, of course, that the foregoing relates to exemplary embodiments of the invention and that modifications may be made without departing from the spirit and scope of the invention as set forth in the following claims.

We claim:

1. A power control system, comprising:
a power source;
an electric machine;

an electrical load coupled to the electric machine;
a prime mover coupled to the electric machine;
a mechanical load coupled to the prime mover; and
a power control module coupled to the power source and the electric machine, wherein
the power control module is configured to operate the electric machine between:
a generating mode supplying power to the electrical load, according to a power control strategy defined by equations comprising:

$$\phi_{ag}=\phi_{fa}+\phi_{sa} \qquad \text{Eq. (1):}$$

where $\phi_{ag}$ is a flux in air-gap, $\phi_{fa}$ is a flux produced by a rotor in a stator windings of the electric machine and $\phi_{sa}$ is a flux caused by a stator current $I_a$ $$E_{ag}=E_{fa}+E_{sa} \qquad \text{Eq. (2):}$$

where $E_{ag}$ is a voltage induced by $\phi_{ag}$, $E_{fa}$ is a voltage induced by $\phi_{fa}$ and $E_{sa}$ is a voltage drop in inductance of an armature in the electric machine, and $$V_a=E_{ag}+(R_a+(j\omega L_a)I_a \qquad \text{Eq. (3):}$$

where $V_a$ is the terminal voltage, $R_a$ is the armature resistance, $\omega$=angular speed, j is a complex operator, $L_s$ is synchronous reactance and
a motoring mode driving the mechanical load.

2. The power control system of claim 1 wherein the prime mover is a turbo-shaft engine.

3. The power control system of claim 1 wherein the electrical load is a traction wheel system.

4. The power control system of claim 1 wherein the mechanical load is a rotary propeller system.

5. The power control system of claim 4 wherein the rotary propeller system includes rotary wings.

6. The power control system of claim 5 wherein the power control module is configured to provide torque at a speed corresponding to the generating mode and drive the rotary propeller system.

7. The power control system of claim 4 wherein one or more traction motors coupled to traction wheels are coupled to the power control module and wherein the power control module is configured to drive the traction wheels during the generating mode.

8. The power control system of claim 1 wherein the motoring mode is operated by controlling and increasing both an excitation current level and a stator current level in the electric machine.

9. The power control system of claim 1 wherein the power control module is configured to also operate the electric machine in a starting mode.

10. The power control system of claim 1 wherein the electric machine is configured to operate in the motoring mode in a generating speed range defined by a vector diagram where a stator current ($I_a$) is placed at a lagging angle ($\alpha$) rotating clockwise around a q-axis with respect to a voltage ($E_{fa}$) induced by a flux ($\phi_{fa}$) produced by a rotor in stator windings of the electric machine.

11. A method of controlling power in a hybrid vehicle that includes a traction wheel system and a rotary propeller system, comprising:
operating an electric machine, coupled to the traction wheel system and the rotary propeller system, in a generating mode to drive the traction wheel system according to a power control strategy defined by equations comprising:

$$\phi_{ag}=\phi_{fa}+\phi_{sa} \qquad \text{Eq. (1):}$$

where $\phi_{ag}$ is a flux in air-gap, $\phi_{fa}$ is a flux produced by a rotor in a stator windings of the electric machine and $\phi_{sa}$ is a flux caused by a stator current $I_a$ $$E_{ag}=E_{fa}+E_{sa} \qquad \text{Eq. (2):}$$

where $E_{ag}$ is a voltage induced by $\phi_{ag}$, $E_{fa}$ is a voltage induced by $\phi_{fa}$ and $E_{sa}$ is a voltage drop in inductance of an armature in the electric machine, and $$V_a=E_{ag}+(R_a+(j\omega L_a)I_a \qquad \text{Eq. (3):}$$

where $V_a$ is the terminal voltage, $R_a$ is the armature resistance, $\omega$=angular speed, j is a complex operator, $L_s$ is synchronous reactance; and
operating the electric machine in a motoring mode providing increased transient power to drive the rotary propeller system according to the power control strategy, wherein the stator current ($I_a$) is placed at a lagging angle ($\alpha$) with respect to the voltage ($E_{fa}$).

12. The method of claim 11 wherein the air-gap flux ($\phi_{ag}$) is unchanged while reducing the terminal voltage.

13. The method of claim 11 wherein the terminal voltage ($V_a$) during the motoring mode is less than the terminal voltage ($V_a$) during the generating mode.

14. The method of claim 11 wherein the operation of the electric machine in the motoring mode produces a reluctance torque added to an interaction torque to drive the rotary propeller system.

15. A hybrid vehicle, comprising:
a body;
a traction wheel system coupled to the body;
a rotary propeller system coupled to the body;
a prime mover coupled to the rotary propeller system;
an electric machine coupled to the prime mover;
a power controller coupled to the electric machine and the traction wheel system, wherein the power controller is configured operate the electric machine between:
a generating mode driving the traction wheel system, according to a power control strategy defined by equations comprising:

$$\phi_{ag}=\phi_{fa}+\phi_{sa} \qquad \text{Eq. (1):}$$

where $\phi_{ag}$ is a flux in air-gap, $\phi_{fa}$ is a flux produced by a rotor in a stator windings of the electric machine and $\phi_{sa}$ is a flux caused by a stator current $I_a$ $$E_{ag}=E_{fa}+E_{sa} \qquad \text{Eq. (2):}$$

where $E_{ag}$ is a voltage induced by $\phi_{ag}$, $E_{fa}$ is a voltage induced by $\phi_{fa}$ and $E_{sa}$ is a voltage drop in inductance of an armature in the electric machine, and $$V_a=E_{ag}+(R_a+(j\omega L_a)I_a \qquad \text{Eq. (3):}$$

where $V_a$ is the terminal voltage, $R_a$ is the armature resistance, $\omega$=angular speed, j is a complex operator, $L_s$ is synchronous reactance and
a motoring mode driving the rotary propeller system, wherein the motoring mode produces a higher torque from the prime mover than the generating mode.

16. The hybrid vehicle of claim 15 wherein the power controller is further configured to operate the electric machine in a starting mode to drive the prime mover.

17. The hybrid vehicle of claim 15 wherein operation of the electric machine in the motoring mode provides a reluctance torque produced by the electric machine added to an interaction torque.

18. The hybrid vehicle of claim 15 wherein the traction wheel system is electrically driven during the generating mode.

19. The hybrid vehicle of claim 15 further comprising a power source coupled to the power controller, wherein the power controller is configured to provide recharging power back to the power source.

* * * * *